July 5, 1949.   H. C. HALFORD   2,474,939
TRACTION DEVICE FOR WHEELS
Filed Sept. 12, 1946   3 Sheets-Sheet 1
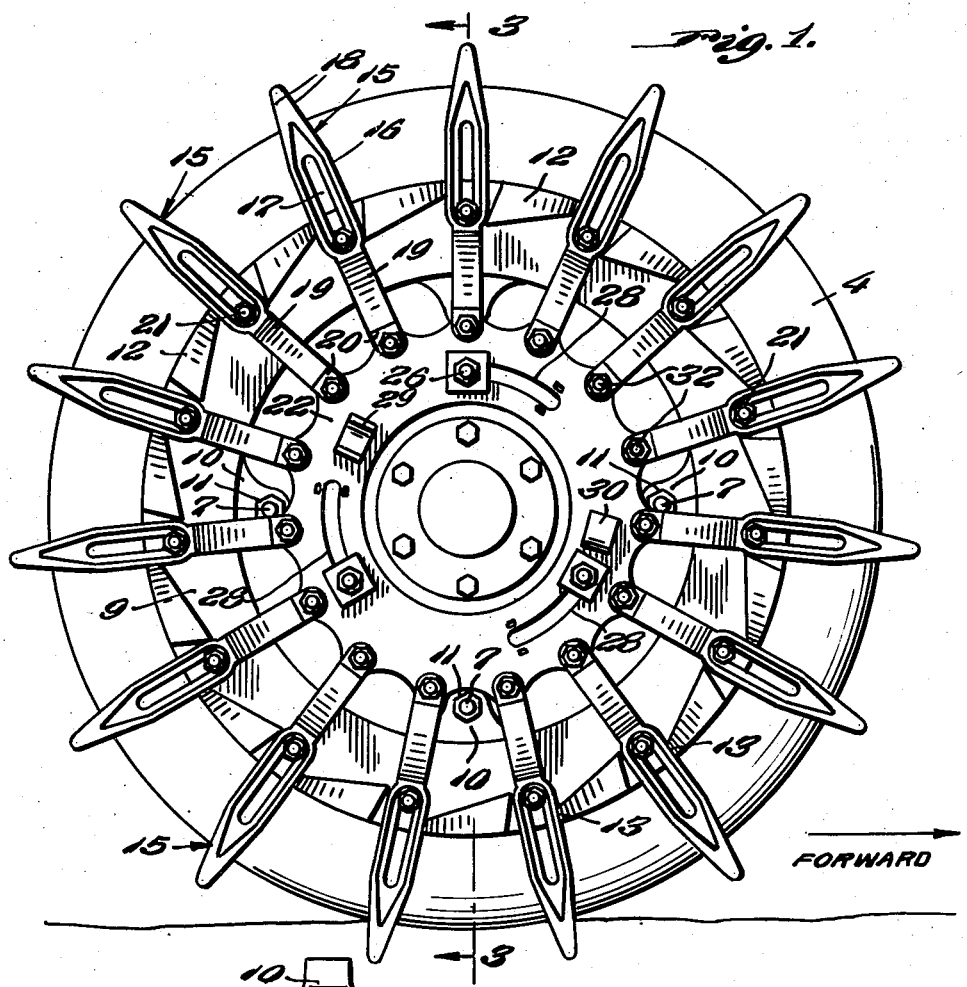

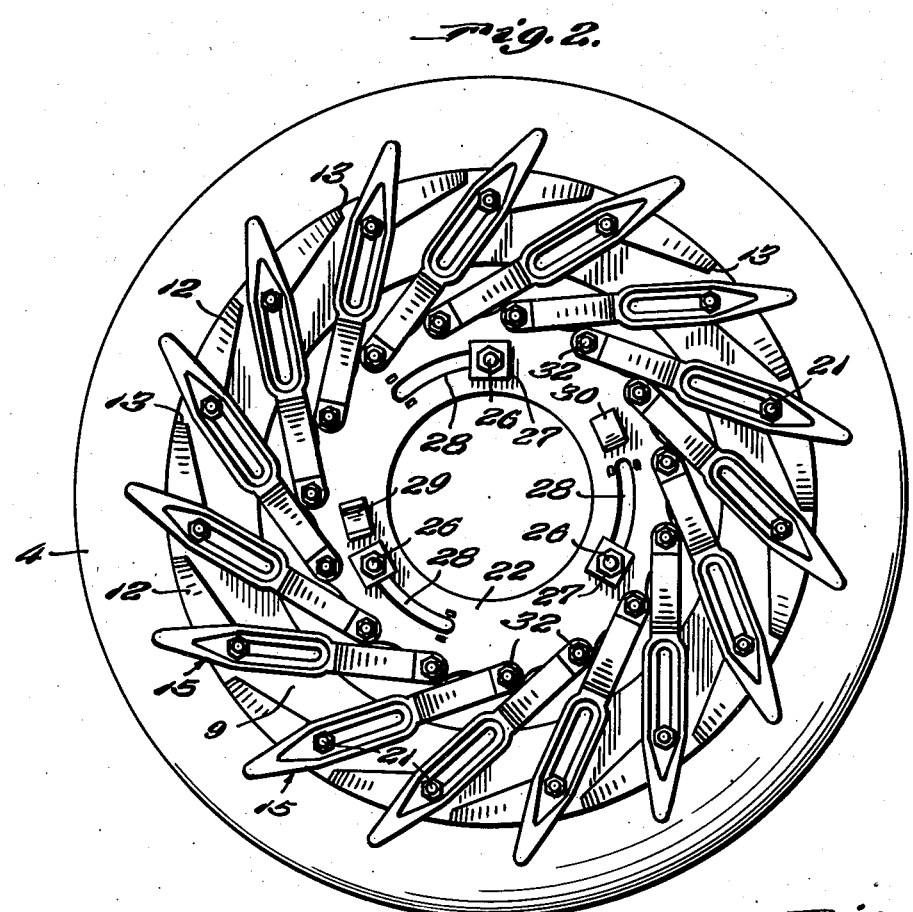
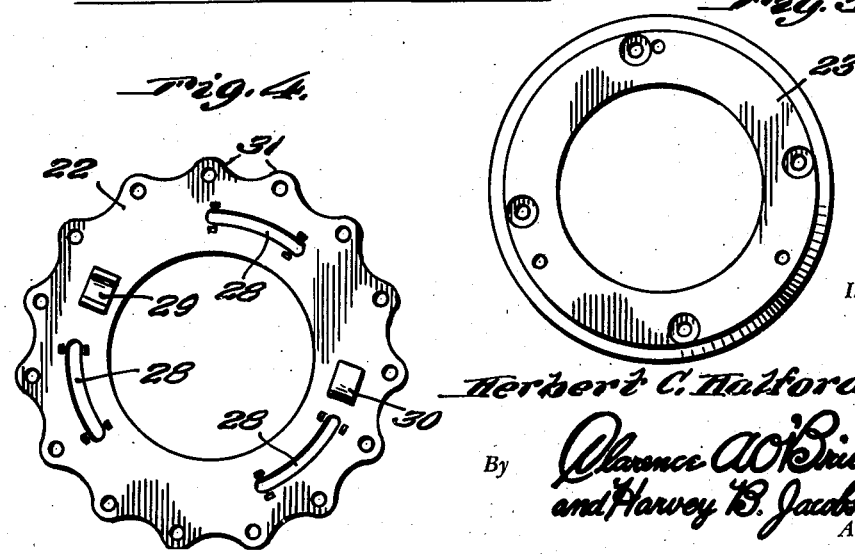

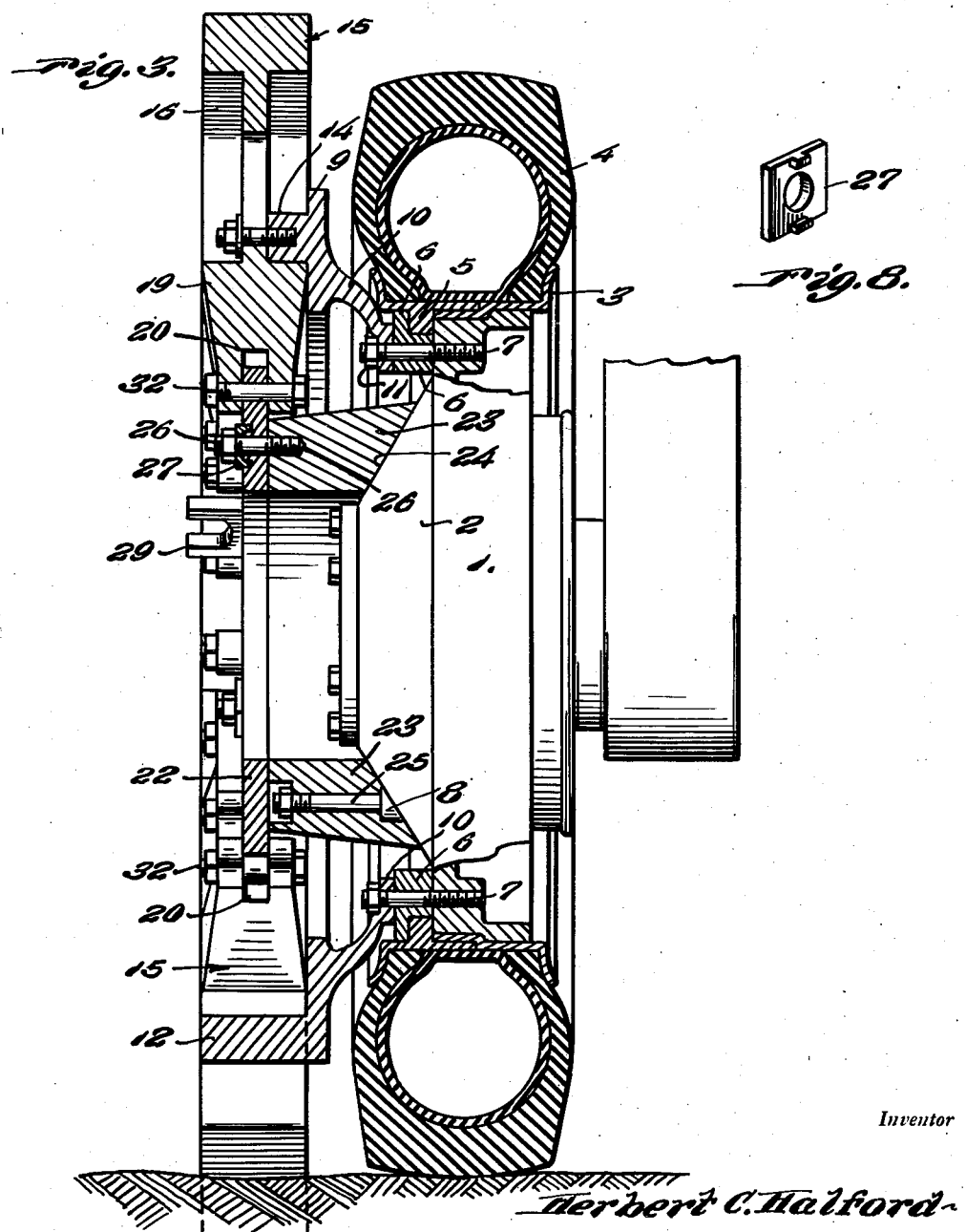

Patented July 5, 1949

2,474,939

UNITED STATES PATENT OFFICE 2,474,939

TRACTION DEVICE FOR WHEELS

Herbert C. Halford, Jonesboro, Ark.

Application September 12, 1946, Serial No. 696,435

1 Claim. (Cl. 301—47)

My invention relates to improvements in traction devices for wheels, especially the traction wheels of agricultural machines.

The invention is designed with the primary object in view of providing a traction unit of simple construction for quick easy attachment to or detachment from the driven rubber tired wheels of present day agricultural machines, to provide heavy duty, auxiliary, traction obtaining means thereon preventing such wheels from slipping, or skidding, in wet, sandy, or loose soil and which is equipped for setting to render the unit ineffective so that the wheels may be used in the usual manner when desired.

Another object is to provide a device of the character and for the purposes set forth which will not easily get out of order or require frequent servicing, and is comparatively inexpensive to manufacture and install.

Other and subordinate objects, comprehended by my invention, together with the precise nature of my improvements, and the advantages thereof, will be readily understood when the succeeding description and claim are read with reference to the drawings accompanying and forming a part of this application.

In said drawings—

Figure 1 is a view in side elevation of my improved traction device in a preferred embodiment thereof applied to a traction wheel, the grouters being projected.

Figure 2 is a view in side elevation with the grouters retracted.

Figure 3 is a view in vertical central section taken on the line 3—3 of Figure 1 and drawn to a larger scale.

Figure 4 is a view in front elevation of the setting member.

Figure 5 is a view in front elevation of the mounting member for the setting member.

Figure 6 is a fragmentary view in edge elevation of the carrier for the grouters.

Figure 7 is a similar view in side elevation; and

Figure 8 is a view in perspective of one of the lock washers.

Referring to the drawings by numerals, my improved traction device has been shown therein, by way of exemplifying a preferred practice of the invention, as attached to a traction wheel 1 of a type utilized on the well-known farm tractor of commerce, said wheel comprising an outwardly tapered front side 2 and supporting a split rim 3 for a pneumatic tire 4, said rim being secured on the wheel 1 by retaining means in the form of a flange 5 on the rim 3 and keepers 6 on bolts 7 clamping the flange 5 against the outer edge of the wheel 1. Bosses, as at 8, are formed on the tapered front side 2 of said wheels for bolting various equipment thereto.

My improved traction device comprises an annular carrier 9 of flat form and larger outside diameter than the rim 3, but smaller than that of the tire 4, and which is secured to the wheel 1 concentrically thereof and on the outboard side of the same by apertured lugs 10 on the rear side of the carrier 9 inclining rearwardly and inwardly of said carrier, and detachably attached to the bolts 7 by the nuts 11 on said bolts. The carrier 9 is provided on the front side thereof with a circumferential series of abutment lugs 12 spaced apart equi-distantly around the peripheral edge of said carrier 9 and formed with stop faces 13 for a purpose presently seen. Also, on the front side of the carrier 9, a circumferential series of equi-distantly spaced bosses 14 are provided and which are arranged intermediate the lugs 12. The described carrier 9 supports a plurality of elongated grouters 15 having channeled ground engaging front sections 16 longitudinally slotted, as at 17, with outer ends edgewise tapered, as at 18, and rear end shanks 19 terminating in bifurcations 20. Bolts 21 extending through the slots 17 into the bosses 14 secure the grouters 15 on the carrier 9 to be set endwise, pivotally and slidably, thereon alongside the front side thereof into projected and retracted positions respectively.

For setting the grouters 15, a setting member 22 of flat ring-like form, and relatively smaller in diameter than the carrier 9, is mounted on the wheel 1 concentrically thereof and co-planar with the plurality of grouters 15. The mounting for the setting member 22 comprises an externally tapered annular mounting member 23 with a beveled rear side 24 fitting against the front side 2 of the wheel 1, and which is secured to said side 2 concentrically thereof by bolts, as at 25, threaded into the described bosses 8. Bolts 26 with lock washers 27 thereon and extending through arcuate slots 28 in said member 22, secure the member 22 to the front side of the mounting member 23 concentrically of the same for limited rotation thereon in opposite directions, respectively. A pair of forked and tubular members 29, 30 are fixed to the front side of the setting member 22 for insertion of a suitable tool, not shown, through the members 30, into the member 29, for rotating said member 22. Circumferentially spaced outer edge ears 31 on the setting member 22 extending into the bifurcations 20 of the shanks 19 of the grouters 15 and bolts 32 extending through said bifurcations and ears, pivotally connect said grouters 15 to the setting member 22.

The manner in which the described invention is designed to be operated and used will be readily understood. To project the grouters 15 it is merely necessary to loosen the bolts 26 and rotate the setting member 22 in one direction, clockwise as viewed in Figure 1, and into its limit of movement in that direction as determined by engagement of the bolts 26 with one end of the slots 28. Such rotation of the setting member 22 swingably and slidably projects the grouters 15 into substantially radial position relative to the wheel 1 with their outer ends extending beyond the periphery of the tire 4 to dig into the ground as the wheel 1 rotates forwardly, clockwise as viewed in Figure 1. With the setting member 22 rotated and the grouters projected as described, the bolts 26 may be tightened to maintain the setting. When it is desired to render the grouters ineffective, the bolts 26 are loosened and the setting member 22 rotated counter-clockwise, as viewed in Figures 1 and 2 into the limit of its movement in that direction as determined by engagement of the bolts 26 with the other ends of the slots 28. Rotation of the setting member 22 in this direction will swingably and slidably retract the grouters 15, on the bolts 21, to withdraw the outer ends thereof within the confines of the periphery of the tire 4 and into the tangential positions relative to the wheel 1 and carrier 9 as shown in Figure 2. By again tightening the bolts 26, the retracted setting of the grouters 15 may be maintained. By removing the bolts 26, 21, 25 and the nuts 11 the entire device may be detached from the wheel 1. As best shown in Figure 1, when the grouters 15 are set into projected positions, said grouters 15 fit flush against the stop faces 13 of the lugs 12, and are backed, when the wheel 1 rotates forwardly, by the same against side thrust.

The foregoing will, it is believed, suffice to impart a clear understanding of my invention, without further explanation.

Manifestly, the invention, as described, is susceptible of modification without departing from the inventive concept and right is herein reserved to such modifications as fall within the scope of the appended claim.

What I claim is:

A traction device for attachment to a wheel comprising an annular carrier adapted to be attached to said wheel at one side thereof and concentrically of the same, elongated grouters pivotally and slidably mounted on said carrier for endwise setting from a tangential retracted position thereon into a radial projected position with ends thereof extending beyond the periphery of the wheel, said carrier having on one side thereof a circumferentially spaced series of lugs for limiting setting of said grouters into and from projected position, means for setting said grouters comprising a ring member freely rotatable on said wheel into opposite limits of rotation thereof for setting said grouters into and from retracted position, and means for securing said ring member in set position in opposite limits of rotation thereof.

HERBERT C. HALFORD.

REFERENCES CITED

The following references are of record in the file of this patent:

UNITED STATES PATENTS

| Number | Name | Date |
|---|---|---|
| 1,605,386 | Beibin | Nov. 2, 1926 |
| 1,906,776 | Straussler | May 2, 1933 |

FOREIGN PATENTS

| Number | Country | Date |
|---|---|---|
| 108,155 | Australia | Aug. 2, 1939 |
| 516,103 | Great Britain | Dec. 21, 1939 |